Oct. 7, 1952

A. O. BECKMAN ET AL 2,613,327

DOSIMETER

Filed Jan. 5, 1951

INVENTORS
ARNOLD O. BECKMAN
HAROLD H. HERD
ALFRED D. ROBINSON

BY Roland A. Anderson

ATTORNEY.

Patented Oct. 7, 1952

2,613,327

UNITED STATES PATENT OFFICE 2,613,327

DOSIMETER

Arnold O. Beckman, Altadena, Harold H. Herd, South Pasadena, and Alfred D. Robinson, Pasadena, Calif., assignors to the United States of America as represented by the United States Atomic Energy Commission Application January 5, 1951, Serial No. 204,522

10 Claims. (Cl. 250—83.6)

The present invention relates to an improvement in radiation detection devices and is particularly concerned with portable detection means of the type suitable for personnel protection.

With the recent emphasis upon nuclear research and the increased availability of radioactive materials for research and industry alike, a need has arisen for adequate detecting equipment with which to determine the presence and amount of radiation. Information of this nature is required both with respect to the control and interpretation of experiments and processes and also in the protection of personnel engaged in this work. In addition to the type of device generally known as survey meters and adapted to indicate the radioactivity of a general area, it has been found necessary to provide personnel engaged in work with radioactive materials with individual detection means which may be carried about with them in order to provide an accurate indication of the amount of radiation actually received by each individual. In this respect so-called film badges have been widely employed; however, they have the disadvantage of requiring processing before the radiation may be measured and are thus unsuited for continuously indicating radiation dosages. There has also been developed a type of electroscope radiation meter, such as the Roentgen Meter of C. C. Lauristen, Patent No. 2,022,117, which has proven quite satisfactory except for the limitations of conventional electroscopes, which thereby limit the applicability of the device. With regard to these limitations it is noted that the charge on the electroscope is prone to leak off rather rapidly, thereby invalidating the reading when the instrument is subjected to strong radiation, and the electroscope leaves or wires tend to come into forceable contact, thereby damaging the electroscope. Further difficulty has been encountered in providing an adequate light source whereby the reading, generally recorded internally of the device may be readily determined.

The present invention comprises an improved dosimeter of the electroscope type which overcomes the above-noted difficulties and limitations connected with this type of device by the accomplishment of the following general objects.

It is an object of the present invention to provide an improved method and means of detecting and indicating radiation.

It is another object of the present invention to provide an improved dosimeter of the electroscope type which is entirely portable.

It is another object of the present invention to provide an improved dosimeter of the electroscope type which is not subject to leakage of the charge from the electrodes thereof.

It is another object of the present invention to provide a dosimeter of the electroscope type having an improved lens arrangement therein.

It is a further object of the present invention to provide an improved dosimeter of the electroscope type having a simplified and improved charging means.

Yet another object of the present invention is to provide an improved dosimeter of the electroscope type having a separate ionization chamber and electroscope chamber.

It is a still further object of the present invention to provide an improved dosimeter of the electroscope type having a hermetically sealed electroscope and ionization chamber.

Many other objects and advantages will become apparent from the following disclosure of the invention and the accompanying drawing wherein:

Fig. 2 is a cross section view of the dosimeter taken on plane 2—2 of Fig. 1;

Fig. 4 is a cross section view of the dosimeter taken on plane 4—4 of Fig. 1;

Fig. 6 is an isometric projection of one of the electroscope electrodes of the dosimeter;

Fig. 7 is an isometric projection of the charging means of the dosimeter of Fig. 1.

Figure 1:
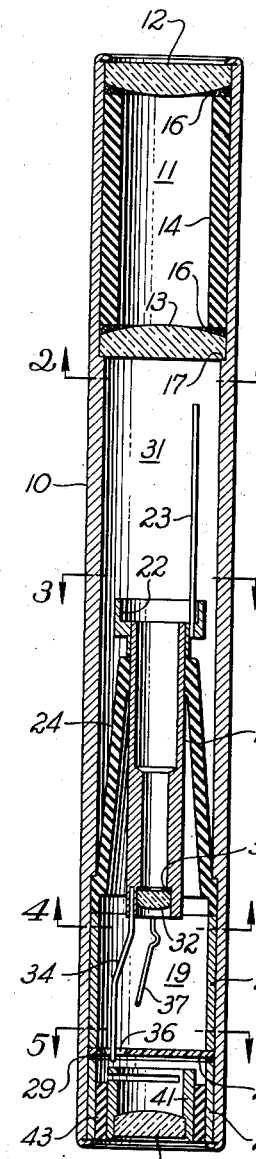
Figure 1 is a longitudinal section view of a dosimeter constructed in accordance with the principles of the present invention.
Figure 3:
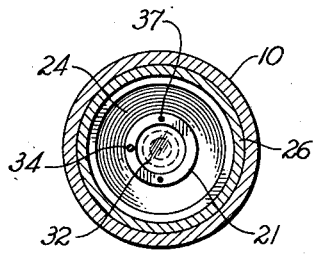
Fig. 3 is a cross section view of the dosimeter taken on plane 3—3 of Fig. 1.
Figure 5:
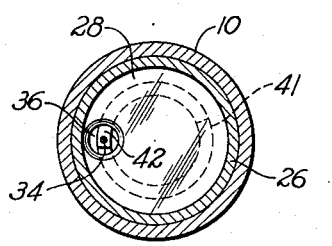
Fig. 5 is a cross section view of the dosimeter taken on plane 5—5 of Fig. 1.

Considering now one preferred embodiment of the present invention, and referring to Figs. 1–5 of the drawing, it will be noted that the dosimeter includes a generally cylindrical or tubular housing 10 which is formed of an electrically conducting material that is pervious to radiation, such as for example aluminum. Within housing 10 and adjacent one end thereof is situated a lens assembly 11 forming a part of the optical system of the dosimeter and consisting of an ocular lens 12 and a reticle lens 13 spaced apart by a cylindrical shell 14. Assembly 11 is preferably assembled in an atmosphere of dry air or other suitable gas and a pair of annular neoprene gaskets 16 are provided between spacer shell 14 and lenses 12 and 13. Assembly 11 is maintained in position within housing 10 by means of a shoulder 17 about the inner circumference thereof against which reticle lens 13 abuts and the edges of cylindrical housing 10 which are rolled inwardly against ocular lens 12 thereby forcing assembly 11 against shoulder 17. A suitable reticle 15, as shown in Fig. 2, is provided on the surface of lens 13 which may, for example, be produced by a photographic contact printing process on a furfural base emulsion.

Also within housing 10 there is provided a specially constructed electroscope assembly 19 which may be advantageously inserted from the other end of housing 10 from lens assembly 11. Electroscope assembly 19 consists of a generally cylindrical charge-receiving member 21 which has a centrally located bore extending therethrough. Member 21 is disposed concentrically about the center line of housing 10 at a distance from lens assembly 11 and has a metal bushing 22 about the outer circumference thereof to which is attached an elongated electrode 23 which extends toward lens assembly 11. Charge-receiving member 21 is formed of an electrically conducting material, such as aluminum, and is supported in position by a relatively long conical insulator 24 which snugly fits about member 21 in abutting relation with bushing 22 and contacts the inner surface of housing 10. Conical insulator 24 may be formed with a protruding shoulder about the outer circumference thereof adjacent the larger end of the cone to contact a shoulder formed about the inner surface of housing 10 thereby restraining conical insulator 24 from movement in the direction of lens assembly 11. A second hollow cylindrical shell 26 having approximately the same outer diameter as the inner diameter of housing 10 may be positioned in housing 10 in abutting relationship with the larger end of conical insulator 24. A further hollow cylinder 27 of the same configuration as shell 26 is also disposed within housing 10 and is separated from shell 26 by a disc 28 which is disposed normal to the center line of housing 10 to act as an electrostatic shield. An annular gasket 29 formed of neoprene or other suitable material is disposed between shell 27 and disc 28 and the ends of housing 10 are rolled inwardly thereby pressing shell 27, gasket 29, disc 28, shell 26 and insulator 24 together and against the above-noted shoulder internal to housing 10 and thereby securing these elements rigidly in position.

The above-noted contact between conical insulator 24 and charge-receiving member 21 is made rigid by suitable means to thereby fix the disposition of member 21 within housing 10. Between charge-receiving member 21 and reticle lens 13 of lens assembly 11 there is defined an ionization chamber generally designated by the numeral 31 in Fig. 1 and containing electrode 23 which extends from bushing 22 about member 21 in a direction preferably parallel to and displaced from the center line of housing 10.

Also, attached to charge-receiving member 21 is an objective lens 32 which is fitted into the expanded bore of member 21 at the opposite end thereof from electrode 23. Objective lens 32 is provided with a shield 33 which is in the form of an apertured disc contiguous with the upper surface of lens 32; both lens 32 and shield 33 being secured in position within the end of charge-receiving member 21 by cement or other suitable means.

Electroscope assembly 19 includes an electroscope chamber defined by shell 26 and extending from charge receiving member 21 to electrostatic shield 28. Within this chamber there is provided an electrode 34 which mates with a hole formed adjacent the outer periphery of charge-receiving member 21 and extending longitudinally thereof. Electrode 34 is formed of an electrically conducting material and is deformed so as to consist of a first straight portion extending substantially normal to the end surface of member 21, a small angle bend, another straight portion, another small angle bend returning the direction of electrode 34 to that of the first straight portion, and a final straight portion extending through an aperture 36 located near the outer periphery of electrostatic shield 28. Also within the electroscope chamber there is situated a flexible electroscope electrode 37 which may consist of a quartz fiber coated with a very thin layer of an electrically conducting material, such as gold or platinum, or may alternatively consist only of a very fine flexible wire of a material such as platinum. Electrode 37 is preferably formed in one piece and consists of a generally U-shaped lower portion 38 connected through a pair of semicircular bends to a pair of straight portions 39 lying in a plane at an angle to the plane of the lower portion. Electrode 37 is mounted by means of holes formed in the end of charge-receiving member 21 adjacent the periphery thereof and extending longitudinally of member 21 and into which straight portions 39 of electrode 37 mate; this mating being made permanent by suitable means to insure inflexibility of the terminus of electrode 37. As will be seen from Figs. 1 and 4, the mounting of electrode 34 in charge-receiving member 21 is equidistant between the two mounting points of electrode 37 on the periphery of the end of member 21 so that in one dimension (normal to the view of Fig. 1) electrode 34 is generally parallel to straight portions 39 of electrode 37 and to the straight sides of the lower U portion 38 thereof, and is substantially equidistant from the sides of the U portion 38 and from the straight portions 39.

Figure 8:
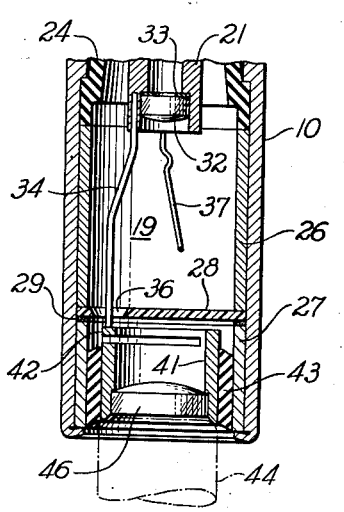
Fig. 8 is an enlarged partial cross section of the dosimeter of Fig. 1 showing the electroscope charging means in charging position.

In addition to the above-noted elements of the invention, there is also provided charging means which fit into housing 10 below electrostatic shield 28, as best illustrated in Fig. 8. The charging means consists of a charging element 41 in the form of a hollow cylinder of somewhat lesser diameter than housing 10 and shell 27. Charging element 41 includes a semicircular spring contact 42 contacting the top thereof, having approximately the same diameter as element 41, and disposed at least in part at some distance from the end of element 41. As shown in Fig. 7, spring contact 42 may be advantageously formed integrally with charging element 41 by cutting almost all the way across cylindrical element 41 so as to leave a thin ring attached thereto by a small portion of the wall thereof and removing a portion of the ring adjacent the connection thereof to cylinder 41; all being conveniently accomplished by conventional machining or casting techniques. Charging element 41 is disposed within housing 10 with the approximate end of spring contact 42 being directly below electrode 34 and is maintained within housing 10 by a deformable insulating gasket 43 in the general form of a cylinder fitted about charging element 41 and bearing upon the inner surface of shell 27. As noted above, shell 27 is secured in position by the ends of housing 10 which are rolled inwardly to bear upon the end surface of shell 27 and thus charging element 41 is secured within housing 10 by the gripping action of insulator gasket 43 which also grips stationary shell 27. By means of the deformable characteristic of gasket 43, charging element 41 is afforded limited axial freedom thereby providing for forced movement thereof toward the electroscope assembly until contact is made between spring contact 42 and electrode 34. By exerting the requisite force upon charging element 41 through a conventional battery 44, as shown in Fig. 8, electrical contact may be made between the battery 44 and electrode 34 of the electroscope assembly. By virtue of the action of insulator gasket 43 in returning to its original configuration following the above-noted deformation, charging element 41 also is returned to its normal position and spring contact 42 is maintained separated from electrode 34 upon release of the force applied to complete the above-noted contact. Insulator gasket 43 may be formed of any suitable material such as rubber, the requirements being that it is deformable, resilient, hermetically seal the interior of housing 10, and provide insulation between charging element 41 and shell 27 and connected housing 10.

Also associated with charging element 41 is a condenser lens 46 which fits into the outer end of element 41 and may abut a shoulder formed about the inner surface of element 41 where it is retained by suitable means, such as by cementing. It will be noted that in addition to condenser lens 46 there is also provided within the dosimeter the above-noted objective lens 32, reticle lens 13, and ocular lens 12. By the provision of the novel charging means and the specially constructed charge-receiving element 21, as well as the particular placement of the other elements of the invention, all as described above, the center of the dosimeter is open for the passage of light. Insofar as light is concerned the only obstructions along the center of the dosimeter are the reticle upon lens 13 and the electroscope fiber 37 and thus there is produced at the upper end of the dosimeter an image of the electroscope fiber 37 upon the reticle, which image is very sharp and clear as a result of the lens system focusing a maximum amount of light through the dosimeter.

Now that the elements and connections of the invention have been disclosed there follows a description of operation of the invention. First considering the unenergized state of the dosimeter, the electroscope fiber 37 is in approximately the position shown in Fig. 1, which is its natural position. In order to charge the dosimeter and place it in condition to indicate radiation, a battery 44 or other suitable source of electrical energy is employed. As illustrated, the charging means of the invention is constructed of appropriate size to mate with a conventional charging battery 44 which when pressed against the lower end of the dosimeter engages charging member 41 and displaces same inwardly of housing 10 whereby electrical contact is made between electrode 34 of the electroscope assembly and spring contact 42 of charging member 41. By this means a charge is applied through charging electrode 34 to charge-receiving element 21 and thus to electrode 23 and electroscope fiber 37, both of which are electrically and mechanically joined to charge-receiving member 21. The dosimeter is thus charged and the battery 44 may be removed, for the dosimeter is in proper condition to indicate radiation. With the dosimeter charged, as described above, both charging electrode 34 and electroscope fiber 37 have a charge of the same polarity thereon and there is thus established an electrostatic force tending to repel these two elements. As a result of the above-noted flexible structure of electroscope fiber 37, this element is bent away from electrode 34 by the repelling electrostatic force and assumes a position substantially as shown in Fig. 8.

The dosimeter is hermetically sealed and within housing 10 there is provided an ionizable atmosphere which may comprise any suitable gas, the choice of which is dependent upon the type of radiation to be measured, the intensity of radiation, and other well-known factors generally known to those skilled in the art. Thus the placement of the charged dosimeter in a position to intercept radiation results in ionization of the atmosphere within the ionization chamber of the dosimeter. As electrode 23 of the ionization chamber has been charged, preferably positively, by the above-recited procedure, a potential difference exists between electrode 23 and the surrounding housing 10, which is generally at substantially ground potential. Thus ionization of the atmosphere within the ionization chamber causes a minute electrical current to flow between electrode 23 and housing 10, or in other words causes a collection upon electrode 23 of charges of an opposite polarity to the original polarity of electrode 23, and thereby reduces the charge upon electrode 23. As electrode 23 is electrically connected to charging electrode 34 and to electroscope fiber 37, the charge upon both of these elements is also reduced proportionately. The reduction of electrical charge upon electrode 34 and fiber 37 produces a corresponding reduction in the electrostatic force repelling these elements and consequently electroscope fiber 37 bends back toward electrode 34 in an amount proportional to the reduction in the force thereon and under the influence of the restoring force of fiber 37. The displacement of fiber 37 is proportional to the charge thereon and as this charge is determined by the amount of ionization of the atmosphere within the dosimeter as produced by radiation passing therethrough, the deflection of electroscope fiber 37 is a measure of the radiation.

The amount of radiation to which the dosimeter has been subjected may be readily determined at any time by optically viewing the dosimeter through the top end and noting the deflection of electroscope fiber 37 as shown on the reticle on lens 13. It will be appreciated that the reticle may be calibrated directly in radiation units or may consist only of an arbitrary scale which may then be compared with corresponding conversion means whereby the amount of radiation is determined.

It is to be further noted with regard to reading the dosimeter that the reticle may be formed separately from lens 13 and provided with conventional means for the movement thereof across the field of vision through the dosimeter in order that the charged position of fiber 37 may be set at zero on the reticle scale, thereby obviating the necessity of employing the difference between the first and some second position of the fiber as the indication of the amount of radiation to which the dosimeter has been subjected.

Attention is directed to the construction and function of charge-receiving member 21 and conical insulator 24. As noted above, charge-receiving member 21 serves to separate the ionization chamber from the electroscope proper, to electrically connect certain elements of each, and to provide a base for the mounting of the electrodes of the dosimeter. Charge-receiving member 21 is itself maintained in position by conical insulator 24 which by virtue of its configuration and disposition provides a very long leakage path from charge-receiving member 21 to housing 10. By reason of the charge-receiving member 21 of the present invention and its particular mounting and disposition the life of the electrodes of the electroscope is increased, the range of radiation intensity which may be measured is increased, and the ability of the dosimeter to maintain a particular reading for a long period of time is materially increased. The fact that the charge on the electrodes of the electroscope is effectively prevented from leaking off materially enhances the practicability and usefulness of the present dosimeter, for to date leakage of the charge from electroscope fibers has proven one of the greatest difficulties with this general type of instrument. Furthermore, the particular construction of charge-receiving member 21 and the charging means, including charging element 41, provides in combination with the lens system of the invention a highly improved means of viewing the disposition of the electroscope fiber 37 and accurately determining the radiation to which the dosimeter has been subjected.

While the present invention has been described with respect to but a single embodiment, it will be apparent to those skilled in the art that numerous modifications and variations are possible within the spirit and scope of the invention and it is thus not intended to limit the invention except as defined in the following claims.

What we claim is:

1. A radiation dosimeter comprising a housing, a charge-receiving member centrally disposed within said housing, an elongated hollow conical insulator disposed about said charge-receiving member and extending to the internal surface of said housing thereby supporting and insulating said charge-receiving member, electroscope electrodes secured to said charge-receiving member and extending therefrom adjacent each other, at least one of said electrodes being flexible to deflect under the influence of electrostatic forces, means to charge said charge-receiving member and said electroscope electrodes with respect to said housing, and means to view the deflection of said flexible electroscope electrode.

2. A radiation dosimeter comprising a housing enclosing an ionizable atmosphere, an ionization chamber and an electroscope chamber within said housing, an electrically conducting charge-receiving member centrally located within said housing, a hollow conical insulator disposed about said charge-receiving member and in rigid contact therewith, said insulator extending to the inner surface of said housing and being rigidly secured thereto thereby supporting and insulating said charge-receiving member which, together with said insulator, separates said ionization chamber from said electroscope chamber, an electrode electrically connected to said charge-receiving member and extending into said ionization chamber, a plurality of electroscope electrodes electrically connected to said charge-receiving member and extending into said electroscope chamber adjacent each other, one of said electrodes comprising a flexible member readily deflected under the influence of electrostatic forces, charging means for applying a potential difference between said charge-receiving member and said housing, and means for optically viewing the position of said flexible electroscope electrode.

3. A radiation dosimeter comprising an electrically conducting housing, an ionization chamber disposed within said housing and including an electrode therein, an electroscope within said housing and including a chamber containing a substantially rigid electrode and a flexible electrode, an electrically conducting charge-receiving member within said housing between said ionization chamber and electroscope and electrically connected to said electrode of the said ionization chamber and to said rigid and flexible electrodes of the said electroscope, an elongated conical insulator surrounding and supporting said charge-receiving member and extending therefrom to said housing whereby said ionization chamber is substantially separated from said electroscope chamber, charging means for instantaneously impressing a potential between said charge-receiving member and said housing which is maintained solely by the insulation therebetween and is diminished solely by ionization within said ionization chamber, and means to view the degree of deflection of the flexible electrode of said electroscope which is proportional to the potential difference remaining between said charge-receiving member and said housing as influenced by ionization produced in said ionization chamber by radiation striking said dosimeter.

4. A radiation dosimeter comprising an electrically conducting housing, an ionizable atmosphere within said housing, an ionization chamber within said housing and including a portion of said housing and an electrode disposed therein, a hollow electrically conducting cylinder centrally disposed within said housing and electrically connected to said electrode of said ionization chamber, a hollow elongated conical insulator contacting said cylinder in fixed relation thereto and extending to said housing thereby supporting and insulating said cylinder, a pair of electroscope electrodes secured to the opposite end of said cylinder from said ionization chamber, one of said pair of electrodes being flexible to deflect under the influence of electrostatic forces, charging means for impressing a charge upon said cylinder, a lens system within said housing and having an optically unobstructed view through said housing and longitudinally of said cylinder, and a reticle disposed within said lens system whereby the degree of deflection of said flexible electroscope electrode is optically determinable.

5. A radiation dosimeter comprising an electrically conducting housing substantially in the form of a hollow cylinder, a second hollow cylinder disposed within said housing in substantially concentric arrangement therewith, an ocular lens at one end of said housing, an electrode electrically connected to said second cylinder and extending therefrom toward said ocular lens to form in combination with said housing an ionization chamber, a rigid electrode and a flexible electrode electrically connected to said second cylinder at the other end thereof from said ionization chamber and comprising an electroscope, a tubular charging element disposed within said housing in substantial alignment therewith and adapted to contact said rigid electroscope electrode for charging said charging member and said ionization chamber and electroscope, and a lens disposed in said charging member and cooperating with said ocular lens to accommodate the passage of light throughout the length of said housing as an aid to the determination of the deflection of said flexible electroscope electrode.

6. A radiation dosimeter comprising a generally tubular housing formed of an electrically conducting material, an ocular lens and a condenser lens mounted one in each end of said housing and having a substantially unobstructed light path therebetween through said housing, an electrode disposed within said housing and in combination with the wall thereof defining an ionization chamber, an electroscope disposed within said housing and including a flexible electrode, a generally cylindrical member disposed between and separating said ionization chamber and said electroscope and electrically connecting said ionization chamber electrode and said electroscope, an objective lens mounted in said cylindrical member in line with said ocular and condenser lenses, and means to charge said cylindrical member whereby said electroscope is charged and the deflection of the flexible electrode thereof is a measure of the ionization within said ionization chamber as produced by radiation passing through the dosimeter and as viewed through said lenses.

7. A radiation dosimeter comprising a generally tubular housing, said housing containing an ionizable atmosphere and being hermetically sealed, a lens system including an ocular lens and a condenser lens disposed one at each end of said housing and a reticle lens and an objective lens disposed intermediate thereto, an electroscope assembly disposed intermediate said condenser lens and said objective lens and having a flexible fiber disposed in the light path between said lenses, a generally cylindrical electrically conducting member disposed intermediate said objective lens and said reticle lens and electrically contacting said electroscope, an insulator supporting said cylindrical member and providing an elongated electrical leakage path between said cylindrical member and said housing, an electrode electrically contacting said cylindrical member and extending therefrom toward said reticle lens and forming in combination with a portion of said housing an ionization chamber, and charging means for impressing a charge between said cylindrical member and said housing whereby said electroscope fiber is deflected and radiation passing through the dosimeter produces ionization of the atmosphere in said ionization chamber which controls the degree of deflection of said electroscope fiber as viewed through said lens system.

8. A radiation dosimeter comprising a generally tubular housing, a lens system within said housing and including a plurality of lenses having a substantially unobstructed light path along the center line of said housing, an ionization chamber having a centrally disposed electrode situated within said housing, an electroscope having a rigid electrode and a flexible fiber disposed within said housing with said fiber being disposed in the field of vision of said lens system, said electroscope and said ionization electrode being electrically connected, and means for charging said electroscope and ionization chamber including a hollow cylinder disposed in the end of said housing and flexibly mounted therein by insulating means to permit limited movement thereof and a spring contact at the end of said cylinder innermost of said housing and adapted to engage the rigid electrode of said electroscope thereby providing controlled means for intermittently electrically charging said electroscope and associated ionization chamber.

9. A radiation dosimeter comprising a generally cylindrical housing formed of an electrically conducting material and containing an ionizable atmosphere, an electroscope within said housing and including a charging electrode and a flexible fiber, a transparent electrostatic shield disposed across said cylindrical housing adjacent said electroscope and having an aperture therein through which said charging electrode extends, a hollow cylindrical charging member formed of electrically conducting material and disposed within said housing on the opposite side of said electrostatic shield from said electroscope, said charging member having a resilient contact at the end thereof adjacent said electrostatic shield and aligned in part with said charging electrode extending through said shield, an annular deformable resilient insulator surrounding said charging member and secured thereto and to the inner surface of said housing and accommodating limited translation of said charging member relative to said housing to produce electrical contact between said charging electrode and the contact upon said charging member thereby to effect charging of said electroscope, and a lens system mounted within said housing including a lens mounted one in said charging member and one at the other end of said housing and having an unobstructed light path therebetween with said flexible electroscope fiber being in focus therein.

10. A radiation dosimeter comprising a housing, an electroscope mounted within said housing and including a flexible fiber, an ionization chamber disposed within said housing and having a pair of electrodes one of which is electrically connected to said electroscope, charging means for electrically charging the electrodes of said ionization chamber and said electroscope, a lens system within said housing and having in focus the flexible fiber of said electroscope, and electrostatic shielding means separating said electroscope from said ionization chamber and from said charging means and including light pervious members in the light path of said lens system.

ARNOLD O. BECKMAN.
HAROLD H. HERD.
ALFRED D. ROBINSON.

REFERENCES CITED

The following references are of record in the file of this patent:

UNITED STATES PATENTS

| Number | Name | Date |
|---|---|---|
| 1,855,669 | Glasser et al. | Apr. 26, 1932 |
| 2,022,117 | Lauritsen | Nov. 26, 1935 |
| 2,168,464 | Yeda | Aug. 8, 1939 |

OTHER REFERENCES

Dosimeters and Pocket Chambers, Landsverk MDDC 395, pp. 1–6, Oct. 28, 1946.